INVENTOR.
ALFRED MARZOCCHI

United States Patent Office 3,705,075
Patented Dec. 5, 1972

3,705,075
GLASS FIBER REINFORCED ELASTOMERS
Alfred Marzocchi, Cumberland, R.I., assignor to Owens-Corning Fiberglas Corporation, Toledo, Ohio
Filed Dec. 16, 1970, Ser. No. 98,813
Int. Cl. C03c 25/02; B32b 17/04
U.S. Cl. 161—176
20 Claims

ABSTRACT OF THE DISCLOSURE

This invention is addressed to the improvement in the bonding relationship between glass fibers and elastomeric materials in the manufacture of glass fiber reinforced elastomeric products wherein individual glass fibers are coated, or bundles of glass fibers are impregnated with a composition including as a glass fiber anchoring agent, a resorcinol silicon compound or a resorcinolato chromic complex.

---

This invention relates to elastomeric products reinforced or otherwise combined with glass fibers and it relates more particularly to the method and compositions employed in the treatment of the glass fibers to enhance the bonding relationship between the glass fibers and the elastomeric material for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which—

Figure 1:
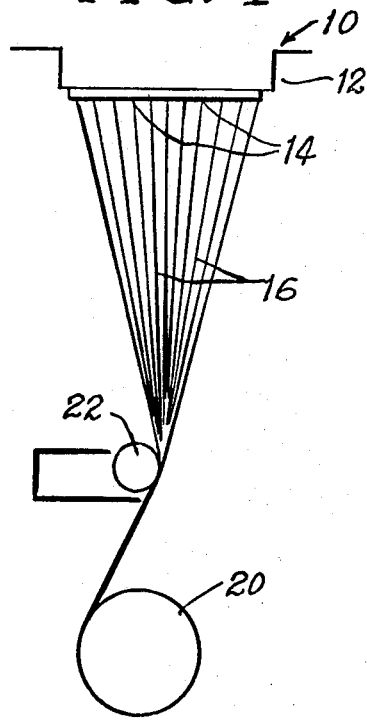
FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the past failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are continuing to be made as represented by the practice of this invention, as will hereinafter be described.

The concepts of the present invention reside in new and improved coupling agents which can be used to enhance the bonding relationship of glass fibers with elastomeric material in the manufacture of glass fiber reinforced elastomeric products. In accordance with one embodiment of the invention, use is made of a resorcinolato silicon compound in which the silicon atom is bonded directly to the aromatic nucleus of a resorcinol group and and which has the formula:

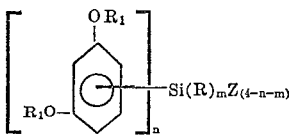

wherein $n$ is an integer from 1 to 3, R is an organic group other than resorcinolato or hydrogen, $R_1$ is hydrogen or $C_1$ to $C_3$ alkyl, $m$ is an integer from 0 to 2, and preferably 0 to 1 and Z is a readily hydrolyzable group, such as halogen (chlorine, bromine, iodine and fluorine) or an alkoxy group containing 1 to 6 carbon atoms (e.g. methoxy, ethoxy, propoxy, etc.).

As the R group, use is preferably made of compounds wherein R is alkyl containing 1 to 8 carbon atoms (e.g. methyl, ethyl, isopropyl, etc.), alkenyl containing 2 to 6 carbon atoms (e.g. vinyl, allyl, etc.) or aryl, such as phenyl, benzyl, etc. In addition the R groups described can be substituted with an amino group or an epoxy group.

The foregoing coupling agents can be prepared by a variety of methods, but the preferred method is described below. Initially, resorcinol is halogenated to form the mono-halogenated derivative in a conventional manner

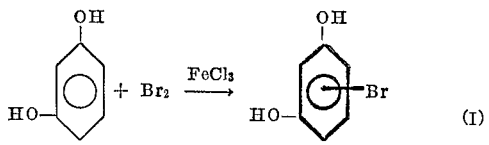

which is in turn reacted to form the corresponding 1,3-dialkoxy derivative in which the alkoxy group contains 1 to 3 carbon atoms to protect the OH groups using methyl iodide or preferably dimethyl sulfate in a known manner as follows

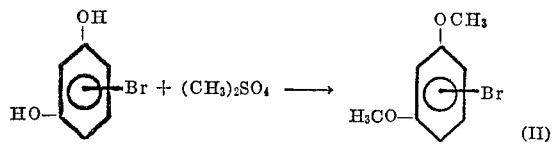

The halo-1,3-dialkoxy product of (II) is then reacted with magnesium in the presence of anhydrous ether to form the Grignard reagent

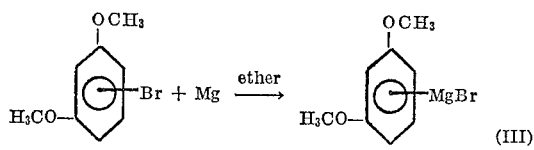

which is in turn reacted with a silicon tetrahalide as follows

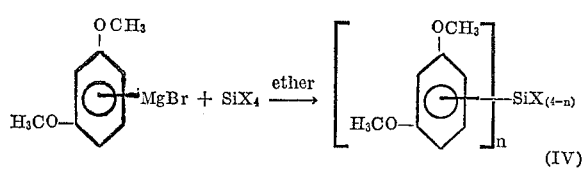

The product of (IV) can be used directly as a coupling agent in accordance with the invention, but is preferably converted to the corresponding resorcinol by hydrolysis with aqueous HI.

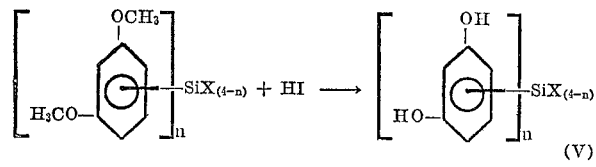

As will be appreciated by those skilled in the art, the value of $n$ will depend upon the ratio of resorcinol magnesium bromide to silicon tetrahalide. The products of (V) can be converted to the corresponding alkoxy silane derivatives by hydrolysis with an alkanol-alkali metal hydroxide mixture. Alternatively, use can be made of an alkoxy halo silane as illustrated by the following equation

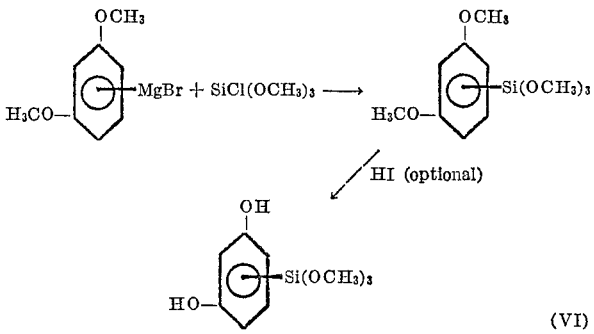

Similarly, the compounds described above when $m$ is 1 can be prepared by utilizing an ogano-substituted silicon compound in reaction III as represented by the following equation:

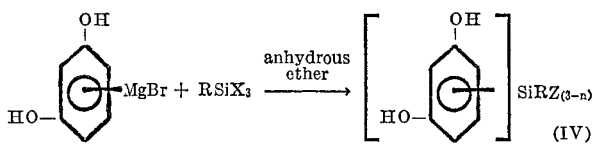

As will be appreciated by those skilled in the art, the resorcinol group is generally bonded to the silicon atom through the 6 and the 2 carbon atoms of the aromatic nucleus, and most frequently at the 6 carbon atom.

Representative of the compounds which can be prepared in accordance with the concepts of this invention include the following:

2,4-dihydroxyphenyltrichloro silane,
2,4-dihydroxyphenyltribromo silane,
dihydroxyphenyltriethoxy silane,
2,4-dihydroxysilane,
2,4-dihydroxyphenylvinyldichloro silane,
2,4-dihydroxyphenylallyldiethoxy silane,
2,4-dihydroxyphenylphenyldimethoxy silane,
2,4-dihydroxyphenylbenzyldimethoxy silane,
2,3-dihydroxyphenyl-p-aminophenyldimethoxy silane,
2,4-dihydroxyphenyl-3-aminopropyldimethoxy silane,
2,4-dihydroxyphenyl-3-glycidoxypropyldiethoxy silane,
2,4-dihydroxyphenylcyclohexyldichloro silane,
2,4-dihydroxyphenyl-gamma-aminoallyldiethoxy silane,
bis(2,4-dihydroxyphenyl)dichloro silane,
tris(2,4-dihydroxyphenyl)monochloro silane,
bis(2,4-dihydroxyphenyl)ethoxy silane,
2,4-dihydroxyphenyldichloro silane,
2,6-dimethoxyphenyltrichloro silane,
2,6-dihydroxyphenyldimethoxy silane,
2,6-dihydroxyphenylvinyldichloro silane,
2,6-dihydroxyphenyl-2-aminoethyldimethoxy silane While not equivalent to the foregoing resorcinolato silanes, use can also be made of resorcinol-containing silanes wherein the silicon atom is bonded to the resorcinol nucleus through a lower alkylene bridge which have the following general formula:

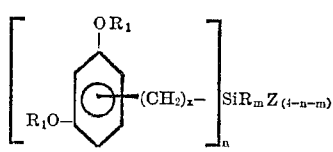

wherein $m$, $n$, R, $R_1$ and Z are as described above, and $x$ is an integer from 1 to 4.

These compounds can be prepared in an analogous manner as described above, which is illustrated below. Initially, resorcinol is haloalkylated in accordance with conventional procedures to form halo-alkyl derivative

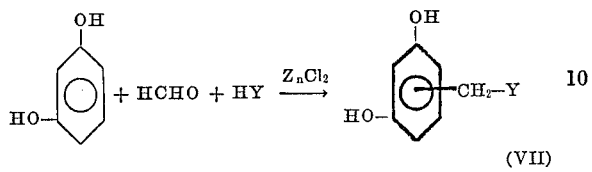

(VII)

which is then reacted with, for example, dimethyl sulfate to protect the OH groups as follows:

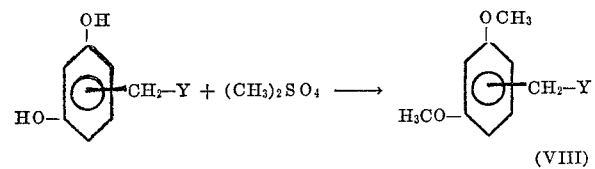

(VIII)

where Y is Cl or Br. The product is then reacted with magnesium to form the corresponding Grignard reagent for reaction with a silicon compound as follows

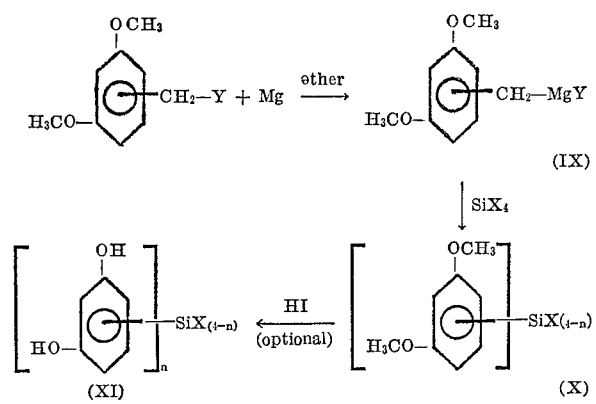

However, as indicated above, use can also be made of alkoxy halo silanes, in which case the reaction proceeds in accordance with the following

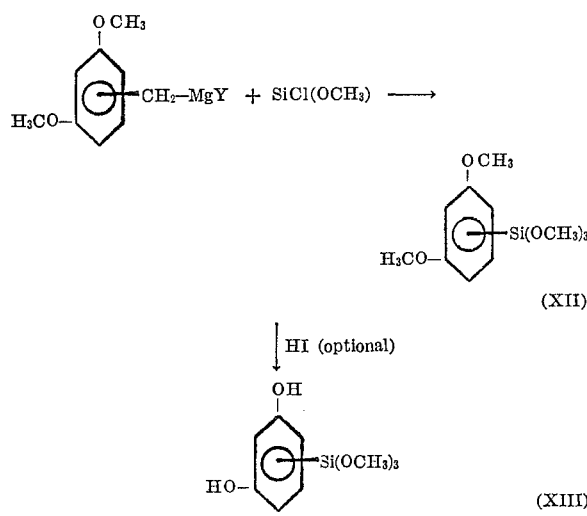

Similarly, when preparing R substituted silanes of the type described above, use is made of an R-substituted silane, as illustrated by the following equation:

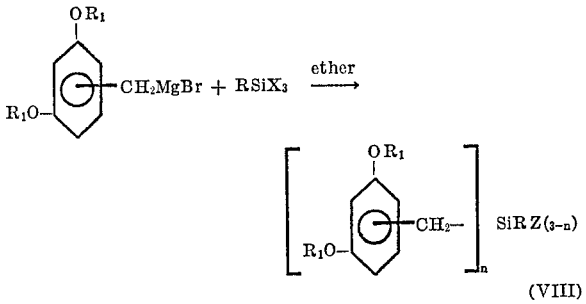

(VIII)

As will be appreciated by those skilled in the art, when it is desired to prepare compounds of the type described in which $x$ is greater than 1, use should be made of higher aldehydes, such as acetaldehyde, propionaldehyde, etc. As indicated above, the haloalkylation reaction or Blanc reaction is preferably carried out in the presence of a catalyst, such as zinc chloride or aluminum chloride. Since the aldehyde reactant is an electrophile, the alkylene bridge is generally found in the 2 or 6 position on the resorcinol nucleus.

Representative of the foregoing group of compounds which can be prepared in accordance with the concepts of the invention include the following:

2,4-dihydroxybenzyltrichloro silane,
2,6-dihydroxybenzyltribromo silane,
2,4-dihydroxybenzyltrimethoxy silane,
2,4-dihydroxybenzylmethyldichloro silane,
2,6-dihydroxybenzylpropyldimethoxy silane,
2,4-dihydroxybenzylvinyldichloro silane,
2,6-dihydroxybenzylallyldimethoxy silane,
2,4-dihydroxybenzylphenyldichloro silane,
2,4-dihydroxybenzyl-3-aminopropyldiethoxy silane,
2,6-dihydroxybenzylcyclopentyldichloro silane,
bis-(2,4-dihydroxybenzyl)dichloro silane,
bis-(2,6-dihydroxybenzyl)chlorosilane,
tris-(2,4-dihydroxybenzyl)ethoxy silane and
bis-(2,4-dihydroxybenzyl)ethylchloro silane In accordance with yet another concept of the present invention, the resorcinolato coupling agents may be employed in the form of an organo metallic complex with chromium. The complexes useful in accordance with practice of the present invention can be prepared by reacting chromyl chloride with resorcinol or a methylol substituted resorcinol at an elevated temperature, such as a temperature within the range of 80 to 120° C. in substantially equimolar proportions.

Without limiting the present invention as to theory, it is believed that the reaction of chromyl chloride with resorcinol takes place in accordance with the following equation:

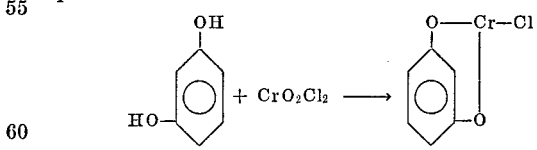

By the same token, the product of the reaction of chromyl chloride with trimethylol resorcinol is a complex of the following type:

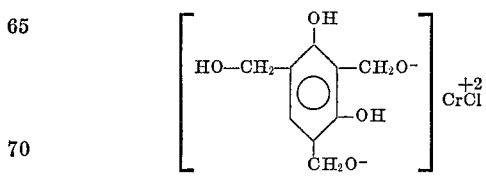

Thus, since the hydrogen atoms of the methylol groups are more labile than those of the OH groups bound to the aromatic nucleus, it is believed that the complex is formed through the oxygen atoms of the methylol groups.

Having described the basic concepts of the invention, reference is made to the following examples which are provided by way of illustration, but not of limitation, of the practice of the invention. In accordance with the preferred practice of the invention, the new and improved coupling agents of the present invention are formulated into an impregnating composition for treatment, as by impregnation, of yarns, cords, strands and fabrics, hereinafter referred to as bundles, wherein the individual glass fibers have preferably, though not necessarily, been sized in forming with a conventional size composition embodying a glass fiber anchoring agent.

EXAMPLE 1

Forming size composition

| | Percent by weight |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| Gamma-aminopropyltriethoxy silane | 1.0 |
| Water | 88.6 |

EXAMPLE 2

Forming size composition

| | Percent by weight |
|---|---|
| Saturated polyester resin | 3.2 |
| Fatty acid amine wetting agent (Nopcogen 16 L) | 0.1 |
| Polyvinyl alcohol | 0.1 |
| Pyrrolidine | 3.0 |
| Gamma-aminopropyltriethoxy silane | 0.3 |
| Glacial acetic acid | 0.1 |
| Water | 93.2 |

EXAMPLE 3

Forming size composition

| | Percent by weight |
|---|---|
| Paraffin wax in aqueous emulsion | 0.2 |
| Cationic amide polyester resin | 1.3 |
| Polyglycol condensate (300 to 400 MW) | 2.3 |
| Gelatin | 0.25 |
| Gamma-aminopropyltriethoxy silane | 0.5 |
| Dibasic ammonium phosphate | 0.1 |
| Glacial acetic acid | 0.2 |
| Water | 95.15 |

EXAMPLE 4

Forming size composition

| | Percent by weight |
|---|---|
| Gamma-aminopropyltriethoxy silane | 0.5 |
| Fatty acid amine wetting agent (Nopcogen 16 L) | 0.25 |
| Water | 99.25 |

Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 4 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The size strands are allowed to air dry or drying of the thin size coating can be accelerated by exposure to elevated temperature such as a temperature within the range of 150° to 250° F. The applied size forms a very thin coating 24 on the surface of the glass fibers 16 to impart a desired balance of lubricity and bonding without destroying the fibrous characteristic or appearance of the fiber.

The strand 18 of sized glass fibers is preferably plied with other strands and twisted to form yarns, threads, or cords which may be used as a reinforcement for elastomeric materials, with or without cutting to shorten lengths, and which can be formed into woven or non-woven fabrics for subsequent combination with elastomeric materials.

After the fibers have been processed into bundles as described, the bundles of glass fibers are impregnated with an impregnant which has been formulated to include one or more of the new and improved coupling agents of the invention, as represented by the following examples:

EXAMPLE 5

Preparation of 2,4-dihydroxyphenyltrimethoxy silane

One mole of resorcinol is brominated by dissolving the resorcinol in trichloroethane, and then adding 0.75 mole of bromine over a period of about 1 hour in the presence of ferric chloride at a temperature of about 80° C.

The resulting 6-bromo resorcinol is separated from the reaction mixture containing predominantly unreacted resorcinol and dibrominated products, and reacted with dimethyl sulfate in the presence of aqueous sodium hydroxide in accordance with conventional procedures to form the corresponding 1,3-dimethoxy-6-bromobenzene. The dimethoxybromobenzene is then dissolved in anhydrous ethyl ether, and magnesium is added to form 2,4-dimethoxyphenyl magnesium bromide.

About 0.5 mole of this Grignard reactant is then added slowly to an anhydrous ether solution containing about 0.3 mole of silicon tetrachloride maintained at a temperature of about 20° C. During the addition of the Grignard reagent, the temperature of the reaction mixture is maintained about 20° C.

The magnesium salts thus formed are removed from the ether solution, and the remaining mixture is heated under vacuum to remove the ether. The resulting product is found to contain predominantly 2,4-dimethoxyphenyltrichlorosilane and a smaller amount of bis-(2,4-dimethoxyphenyl)dichlorosilane, which is separated.

The resulting 2,4-dimethoxyphenyltrichlorosilane is just hydrolyzed with HI and then reacted at room temperature with potassium methoxide in a molar ratio of 3 moles of the alkoxide per mole of silane. The resulting product is found to be 2,4-dihydroxyphenyltrimethoxysilane. It will be understood that this product can also be produced by using trimethoxychlorosilane instead of the $SiCl_4$ whereby the use of alcoholic KOH can be avoided.

EXAMPLE 6

Impregnating composition

An impregnating composition is formulated as follows:

| | Percent by wt. |
|---|---|
| Natural rubber latex-resorcinol formaldehyde resin (38% solids—"Lotol 5440") | 31.0 |
| 2,4-dihydroxyphenyltrimethoxy silane | 1.0 |
| Water | 68.0 |

Figure 2:
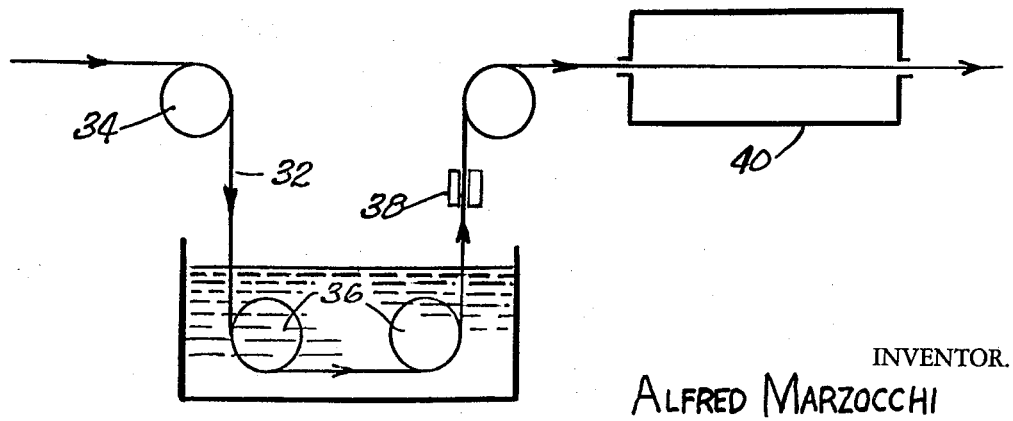
FIG. 2 is a flow diagram illustrating the treatment of glass fibers subsequent to their being formed into bundles in accordance with the preferred practice of this invention.

Impregnation with the aqueous composition of Example 4 can be made by conventional means for impregnation, such as by immersion of the bundles of glass fibers in a bath of aqueous impregnating composition. Referring more specifically to FIG. 2 of the drawing, a glass fiber bundle 32 in which the individual fibers have been sized in forming with one of the size compositions of Examples 1 to 4 is advanced over a guide roller 34 for fuller impregnation of the bundle. The impregnated bundle is then raised from the bath for passage through a roller or die 38 which operates to remove excess impregnating composition from the bundle and to work the impregnating composition into the bundle. Thereafter, the endless bundle is advanced over the roller 39 into a drying oven preferably in the form of an air drying oven maintained at a temperature above ambient temperature and preferably at a temperature within the range of 150° to 350° F. to accelerate removal of the aqueous diluent and to set the impregnating material in situ in the glass fiber bundle. Drying will occur in a relatively short period of time ranging from 1 to 30 minutes, depending somewhat upon the temperature of drying. Use can be made of dielectric treatment to coagulate the latex with little or no drying.

Suitable resorcinol aldehyde resins and combinations thereof with natural rubber latex are marketed by the U.S. Rubber Company under the trade name "Lotol 5440." For the preparation of such materials, reference can be made to Canadian Patent No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

The resorcinol containing coupling agents of the present invention are believed to have a superior compatibility with resorcinol aldehyde latices of the type described above. It is possible, without limiting the invention as to theory, that the resorcinol group of the coupling agent is absorbed into the resorcinol aldehyde matrix during cure or vulcanization of the impregnated bundle when admixed with elastomeric materials in the manufacture of glass fiber-reinforced elastomeric products, while the silicon portion of the molecule remains anchored to the glass fiber surfaces to thereby further enhance the integration of the glass fibers with elastomeric materials.

It will be understood by those skilled in the art that, while in Example 5, description is made of the separation of the crude resorcinol silane mixture prior to use, this separation step can conveniently be omitted since both the 2,4-dihydroxyphenyl silane and the bis-(2,4-dihydroxyphenyl)silane are capable of serving as a coupling agent in the practice of the invention.

Additional examples of this concept of the invention are as follows:

EXAMPLE 7

Impregnating composition

The following impregnating composition is formulated to contain the bis-(2,4-dimethoxyphenyl)dichlorosilane prepared in Example 5.

Percent by wt.
Natural rubber latex-resorcinol formaldehyde resin
  (38% solids—"Lotol 5440") _____ 30.0
Bis-(2,4-dimethoxyphenyl)-dichloro silane _____ 1.5
Tetraethanol ammonium hydroxide _____ 4.5
Water _____ 64.0

It is sometimes desirable to include in the impregnating composition a basic material, such as a tetraorgano ammonium hydroxide, to promote stability of the composition. For this purpose, use can be made of tetraalkyl or tetraalkanol ammonium hydroxides, as represented by tetramethyl, tetraethyl, tetraethanol, and tetramethanol ammonium hydroxides as well as long chain quaternaries such as trimethyllaurylammonium hydroxide, triethylstearyl ammonium hydroxide in an amount preferably within the range of 2 to 10 times the amount of the silane present.

In accordance with the preferred practice of the invention, the impregnating compositions are formulated to contain a solids content of between 10 and 50% solids by weight. For best results, application should be made in an amount to deposit in the bundle dry solids constituting between 5 and 25% by weight, and preferably 10 to 15% by weight, of the glass fiber system.

EXAMPLE 8

Preparation of 2,4-dihydroxyphenylvinyldimethoxy silane

About one mole of the 2,4-dimethoxyphenyl magnesium bromide prepared in the manner described in Example 5 is reacted with vinyltrichlorosilane dissolved in anhydrous ethyl ether at a temperature maintained below 20° C.

The resulting product, 2,4 - dimethoxyphenylvinyldichloro silane, is separated from unreacted reactants and higher boiling products. Thereafter, this product is hydrolyzed first with HI and then with methanolic KOH in the manner described in Example 5 to form 2,4-dihydroxyphenylvinyldimethoxy silane, which can be formulated into an impregnating composition of the type illustrated in Examples 6 and 7.

EXAMPLE 9

Preparation of 2,6-dihydroxyphenylallylchloro silane

Resorcinol is brominated in the manner described in Example 5 and 2-bromo-resorcinol is separated from the reaction mixture. Thereafter, the 2-bromo product is reacted with dimethyl sulfate to form the corresponding dimethoxy-bromo derivative which is dissolved in anhydrous ethyl ether and reacted with metallic magnesium to form 2,6-dimethoxyphenyl magnesium bromide.

The resulting Grignard reactant is then reacted with allyldichloro silane in anhydrous ethyl ether and hydrolyzed with HI to form 2,6-dihydroxyphenylallyldichloro silane, which can be formulated into an impregnating composition of the type described in Examples 6 and 7.

EXAMPLE 10

Preparation of 2,4-dihydroxyphenyl-3-aminopropyldiethoxy silane

One mole of the 2,4-dimethoxyphenyl magnesium bromide prepared in Example 5 is reacted with 1.5 moles of gamma-aminopropyltrichloro silane dissolved in anhydrous ethyl ether in the manner described in Example 5. After removal of unreacted silane, the product is found to be predominantly 2,4-dimethoxyphenyl-3-aminopropyldichlorosilane.

This material is then separated from higher boiling products, and hydrolyzed with HI and potassium ethoxide to form 2,4 - dihydroxyphenyl - 3 - aminopropyldiethoxy silane which be formed into an impregnating composition of the type illustrated in Examples 6 and 7.

EXAMPLE 11

Preparation of 2,6-dihydroxyphenyl-3-glycidoxypropyldimethoxy silane

The 2,6-dimethoxy phenyl magnesium bromide prepared in Example 9 is reacted with gamma-glycidoxy propyltrichlorosilane in the manner described in Example 5.

The resulting product is 2,6-dimethoxyphenyl-3-glycidoxypropyldichloro silane which is reacted with HI and potassium methoxide to form 2,6-dihydroxyphenyl-3-glycidoxypropyldimethoxy silane which can be formulated into an impregnating composition of the type illustrated in Examples 6 and 7.

EXAMPLE 12

Preparation of 2,4-dihydroxybenzyltrimethoxy silane

One mole of resorcinol is reacted with one mole of formaldehyde and one mole of hydrogen bromide in aqueous alcohol in the presence of zinc chloride at a temperature of about 80° C. for a period of 1 hour. The predominant product is 6-bromomethyl resorcinol while some 2-bromomethyl resorcinol is also formed as well as high boiling products.

The 6-bromomethyl resorcinol is separated from the reaction mixture, and reacted with dimethyl sulfate to form 1,3-dimethoxy-6-bromomethyl benzene which is separated, dried and dissolved in anhydrous ethyl ether. Thereafter, metallic magnesium is added to form 2,4-dimethoxybenzyl magnesium bromide in accordance with the procedure described in Example 5.

The resulting Grignard reagent is then reacted with silicon tetrachloride in a mole ratio of about 2 moles of Grignard reagent per mole of tetrachloride by means of the procedure described in Example 5. The product of the reaction is found to be primarily 2,4-dimethoxybenzyl-trichloro silane along with small amounts of bis-(2,4-dimethoxybenzyl)dichloro silane.

The former is separated from the reaction mixture by fractional distillation, and reacted with HI and then potassium methoxide to convert the material to 2,4-dihydroxybenzyltrimethoxy silane.

EXAMPLE 13

Impregnating composition

The trimethoxy silane prepared in Example 12 is formulated into the following impregnating composition:

| | Percent by wt. |
|---|---|
| Natural rubber latex-resorcinol formaldehyde resin (38% solids—"Lotol 5440") | 33.0 |
| 2,4-dihydroxybenzyltrimethoxy silane | 1.5 |
| Water | 65.5 |

Application of the foregoing impregnating composition can be made in the manner described with reference to Example 6.

EXAMPLE 14

Preparation of bis-(2,4-dihydroxybenzyldimethoxy silane

The bis-(2,4-dimethoxybenzyl)dichloro silane obtained as a by-product of the reaction in Example 12 is reacted with HI and then potassium ethoxide.

The resulting product is bis-(2,4-dihydroxybenzyl)dimethoxy silane which can be formulated into an impregnating composition of the type illustrated in Examples 6, 7 and 13.

EXAMPLE 15

Preparation of 2,6-dihydroxybenzylvinyldimethoxy silane

The 2-bromomethyl dimethoxy benzene prepared in Example 12 is reacted with magnesium in anhydrous ethyl ether to form the corresponding Grignard 2,6-dimethoxybenzyl magnesium bromide, which is reacted with vinyltrimethoxy silane.

The product is 2,6-dimethoxybenzylvinyldimethoxy silane which is thereafter hydrolyzed with HI to form 2,6-dihydroxybenzylvinyldimethoxy silane which can be formulated into an impregnating composition of the type illustrated in Examples 6, 7 and 13.

EXAMPLE 16

Preparation of 2,4-dihydroxybenzyl-3-aminopropyl-diethoxysilane 2,4-dimethoxybenzyl magnesium bromide prepared in the manner described in Example 12 is reacted with gamma-aminopropyltrichlorosilane dissolved in anhydrous ether to form 2,4-dimethoxybenzyl-3-aminopropyldichlorosilane, which is hydrolyzed to form the corresponding 2,4-dihydroxybenzyl-3-aminopropyldiethoxysilane.

While the invention has been described above with reference to resorcinol silanes, it will be understood that use can also be made of the foregoing silanes in the form of the corresponding silanols or polysiloxane polymers. This concept of the invention may be represented by the following examples.

EXAMPLE 17

2,4-dihydroxyphenyltrichlorosilane prepared in the manner described in Example 5 is hydrolyzed at room temperature with HI another with excess KOH solution.

The product is believed to be a silanol of the formula:

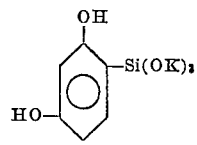

which can be formulated into an impregnating composition of the type illustrated in Example 6.

EXAMPLE 18

2,4-dihydroxybenzyltrimethoxy silane is polymerized in the presence of water at 70° C. for a period of about 20 minutes.

The resulting product is a highly viscous liquid, and is a polysiloxane having an average molecular weight of about 500, which can be formulated into an impregnating composition of the type illustrated in Example 6.

EXAMPLE 19

Preparation of resorcinolato chromium complex

One mole of resorcinol dissolved in benzene is reacted with 1 mole of chromyl chloride at a temperature of 85° C. for about 20 minutes.

After the evolution of chlorine has ceased, the complex is separated from the reaction mixture, and is believed to have the formula:

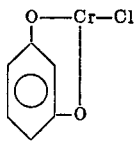

EXAMPLE 20

Impregnating composition

The complex prepared in Example 19 is formulated into the following impregnating composition:

| | Percent by wt. |
|---|---|
| Natural rubber latex-resorcinol formaldehyde resin (38% solids—"Lotol 5440") | 30.0 |
| Complex of Example 19 | 2.0 |
| Water | 68.0 |

The foregoing composition can be applied as an impregnant to a glass fiber bundle in the same manner as is described with reference to Example 6.

EXAMPLE 21

Preparation of trimethylol resorcinolato chromic complex 2,4,6-trimethylol resorcinol is prepared by reacting formaldehyde with resorcinol in the presence of a zinc chloride catalyst at a temperature of 85° for a period of about 2 hours. The product is thereafter separated from the unreacted materials or high boiling products are then reacted with chromyl chloride in a molar ratio of about 1 mole of the trimethylol resorcinol per 1 mole of chromyl chloride in the manner described in Example 19.

The resulting material is a complex of the trimethylol resorcinol with chromium which is believed to have the following formula:

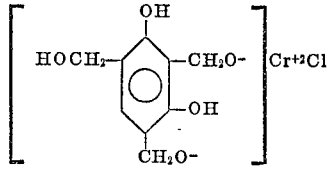

EXAMPLE 22

Impregnating composition

The complex prepared in Example 21 is formulated into the following impregnating composition:

| | Percent by wt. |
|---|---|
| Natural rubber latex-resorcinol formaldehyde resin (38% solids—"Lotol 5440") | 30.0 |
| Complex of Example 21 | 2.0 |
| Water | 68.0 |

It has been found that when use is made of the chromium complexes described above as coupling agents in alkaline media, such as the resorcinol-formaldehyde latex and vinyl pyridine systems described above, the acidic character of the chromium complexes may tend to be incompatible with the alkaline system and thereby cause coagulation of portions of the alkaline latices, particularly at high concentrations of the complex coupling agents in the treating compositions where the emulsifying agent of the latex system is insufficient to emulsify the chromium complex. It has been found in accordance with another concept of the invention that the compatibility of such chromic complexes with alkaline systems can be improved by reacting the complex with an amine compound. The resulting product is stable in alkaline media at all concentrations.

As the amine compound which is reacted with the chromium complexes to produce a complex which is stable in alkaline media, use can be made of alkanol amines containing 1 to 6 carbon atoms such as trimethanol amine, ethanol amine, diethanol amine, triethanol amine, propanol amine, dipropanol amine, tripropanol amine, dibutanol amine, tributanol amine, etc.; or alkylene polyamines in which the alkylene group contains 2 to 4 carbon atoms, such as ethylene diamine, diethylene triamine, triethylene tetraamine, tetraethylene pentamine, propylene diamine, dipropylene triamine, butylene diamine, dibutylene triamine, etc.

The reaction can conveniently be carried out by contacting the amine compound with the chromium complex at room temperature for a period of up to about one hour, although the reaction which occurs usually takes place quite rapidly. Higher or lower temperatures may be used as desired, with temperatures within the range of 0° to the boiling point of the amine compound employed. The amount of amine compound employed is similarly not critical and can be varied within wide ranges. For best results, use should be made of from 0.50 to 4.0 moles of the amine compound per mole of complex.

It has also been found that the modification of chromium complexes with an amine as described is also applicable to the so-called Werner complexes which contain a carboxylato group, preferably having 2 to 20 carbon atoms coordinated with a trivalent nuclear chromium atom. As will be apparent to those skilled in the art, the carboxylato group may be substituted by an amine group or an epoxy group. Representative of such complexes include propylato chromic chloride, aminopropylato chromic chloride, glycine chromic complex, B-alanine chromic complex, methacylato chromic chloride, glycylato chromic chloride, stearato chromic chloride as well as a variety of others known to those skilled in the art.

This concept of the invention may be illustrated by the following examples.

EXAMPLE 23

The chromic complex prepared in Example 19 is mixed with triethanol amine in a mole ratio of 1:1, and the resulting mixture is allowed to stand for about 10 minutes. The reaction product is then placed in water for formulation into the following impregnating composition

| | Percent by weight |
|---|---|
| Natural rubber latex-resorcinol formaldehyde resin (38% solids—"Lotol 5440") | 30.0 |
| Modified chromic complex | 4.0 |
| Water | 64.0 |

EXAMPLE 24

The procedure described in Example 23 is repeated using methacrylato chromic chloride and diethanol amine. The modified complex can then be formulated into an impregnating composition of the type described in Example 23.

EXAMPLE 25

The procedure of Example 23 is again repeated using aminopropylato chromic chloride and diethylene triamine. The resulting modified complex can then be formulated into an impregnating composition of the type described in Example 23 whereby the modified anchoring agent serves to enhance the integration of impregnated glass fibers with elastomeric materials.

EXAMPLE 26

The procedure of Example 23 is again repeated using the trimethylol resorcinolato chromic complex prepared in Example 21. The resulting modified complex can then be formulated into an impregnating composition of the type described in Example 23.

EXAMPLE 27

The procedure employed in this example is the same as that described in Example 26 except the triethanol amine is replaced by an equivalent amount of ethylene diamine.

As indicated above, because of their improved compatibility with alkaline media, the modified complexes of this embodiment of the invention can be used in any amount. However, for reasons of economy, it is generally desirable to limit the amount of such complexes employed to about 20% by weight of treating composition, and preferably 10% by weight.

In accordance with yet another embodiment of the present invention, use can be made of other elastomer compatible materials in lieu of the resorcinol aldehyde latices as described above. For example, use can be made of an impregnating composition formulated of a mixture of vinyl pyridine-butadiene-styrene terpolymer and a resorcinol aldehyde resin of the type described in U.S. Pat. No. 3,424,608. The vinyl pyridine terpolymer used in accordance with this concept of the invention is a terpolymer of about 15 parts by weight vinyl pyridine, 70 parts by weight butadiene and 15 parts by weight styrene. Suitable vinyl pyridine terpolymers are described in the aforementioned patent, and are commercially available under the trade name "Gentac" from the General Tire & Rubber Company and "Pliolite VP100" from the Goodyear Tire & Rubber Company. This concept of the invention may be illustrated by references to the following examples:

EXAMPLE 28

| | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer | 15–50 |
| Neoprene rubber latex (50% solids) | 25–50 |
| Butadiene latex (60% solids) | 5–15 |
| Alkali metal hydroxide | .05–0.2 |
| 2,4-dihydroxyphenylvinyldimethoxy silane | 0.1–3.0 |

EXAMPLE 29

| | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer | 15–50 |
| Neoprene rubber latex (50% solids) | 25–50 |
| Butadiene latex (60% solids) | 5–15 |
| Alkali metal hydroxide | .05–0.2 |
| 2-(2′,4′-dihydroxyphenyl)-ethyltriethoxy silane | 0.1–3.0 |

EXAMPLE 30

| | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer | 15–50 |
| Neoprene rubber latex (50% solids) | 25–50 |
| Butadiene latex (60% solids) | 5–15 |
| Alkali metal hydroxide | .05–0.2 |
| Complex of Example 19, or 24 to 27 | 0.1–3.0 |

EXAMPLE 31

| | Parts by wt. |
|---|---|
| Resorcinol formaldehyde resin | 2–10 |
| Formaldehyde (37% solution) | 1–3 |
| Concentrated ammonium hydroxide | 2–5 |
| Vinyl pyridine-butadiene-styrene terpolymer | 15–50 |
| Neoprene rubber latex (50% solids) | 25–50 |
| Butadiene latex (60% solids) | 5–15 |
| Alkali metal hydroxide | .05–0.2 |
| Complex of Example 21 | 0.1–3.0 |

Water is incorporated into each of the foregoing compositions in amounts to produce an impregnating composition having a minimum solids content of 10% by weight and a maximum solids content of 50% by weight. Application of the resulting composition can be made in the manner illustrated in FIG. 2 of the drawing.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against mutual abrasion. Thus, it is desirable to achieve as deep penetration as possible with the impregnating composition into the glass fiber bundle. The deeper the peneration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

In accordance with yet another concept of the present invention, the new and improved coupling agents of the present invention may be used in a size composition of the type illustrated in Examples 1 to 4 in which a size composition is formulated to include a film forming material and/or a glass fiber impregnant and the coupling agent. This concept of the invention may be illustrated by the following examples:

EXAMPLE 32

Forming size composition

| | Percent by weight |
|---|---|
| Partially dextrinized starch | 8.0 |
| Hydrogenated vegetable oil | 1.8 |
| Cationic wetting agent (lauryl amine acetate) | 0.4 |
| Nonionic emulsifying agent | 0.2 |
| 2,4-dihydroxyphenyltrimethoxy silane | 1.0 |
| Water | 88.6 |

EXAMPLE 33

Forming size composition

| | Percent by weight |
|---|---|
| Saturated polyester resin | 3.2 |
| Fatty acid amine wetting agent (Nopcogen 16 L) | 0.1 |
| Polyvinyl alcohol | 0.1 |
| Pyrrolidine | 3.0 |
| Complex of Examples 19, 21 or 24 to 27 | 0.3 |
| Glacial acetic acid | 0.1 |
| Water | 93.2 |

EXAMPLE 34

Forming size composition

| | Percent by weight |
|---|---|
| Paraffin wax in aqueous emulsion | 0.2 |
| Cationic amide polyester resin | 1.3 |
| Polyglycol condensate (300 to 400 MW) | 2.3 |
| Gelatin | 0.25 |
| 2,4-dihydroxybenzyltriethoxy silane | 0.5 |
| Dibasic ammonium phosphate | 0.1 |
| Glacial acetic acid | 0.2 |
| Water | 95.15 |

EXAMPLE 35

Forming size composition

| | Percent by weight |
|---|---|
| Siloxane polymer of Example 18 | 0.5 |
| Fatty acid amine wetting agent (Nopcogen 16 L) | 0.25 |
| Water | 99.25 |

Figure 3:
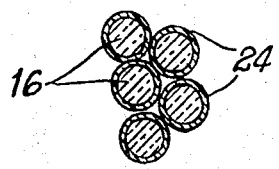
FIG. 3 is a cross-sectional view of glass fibers processed in accordance with the diagram illustrated in FIG. 1; and, FIG. 4 is a cross-sectional view of a bundle of glass fibers processed in accordance with the flow diagram of FIG. 2.
Figure 4:
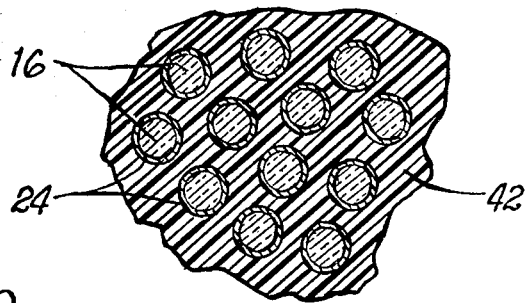

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance their processing and performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material is processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be understood that the impregnating compositions as illustrated by Examples 6 to 31 may also be employed as sizing compositions for treatment of individual glass fibers to form a thin coating thereoin. When used as a size composition, the composition is preferably formed with lesser dilution with aqueous medium since the new and improved coupling agents of the present invention which are embodied in the size composition will continue to operate as an anchoring agent to further facilitate the bonding relationship or integration between the elastomeric material of the continuous phase and the treated glass fibers. It will be further understood that the glass fibers may be treated in forming with a size composition as represented by Examples 32–35, followed by impregnation of strands, yarns, cords or fabrics formed therefrom with impregnating compositions of the type described with reference to Examples 6 to 31.

It will be apparent that I have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combinations with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

What is claimed is:

1. A glass fiber bundle having an impregnant therein, said impregnant comprising an elastomer compatible material and a coupling agent selected from the group consisting of (1) a compound of the formula:

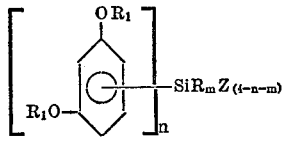

wherein Z is a readily hydrolyzable group, $n$ is an integer from 1 to 3, $m$ is an integer from 0 to 2, R is selected from the group consisting of hydrogen and an organic group other than resorcinol, and $R_1$ is selected from the group consisting of hydrogen and $C_1$ to $C_3$ alkyl (2) a compound of the formula:

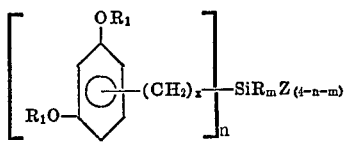

wherein R, $R_1$, $m$, $n$ and Z are as set forth above and $x$ is an integer from 1 to 4 and (3) silanols and polysiloxanes of (1) and (2) above.

2. A glass fiber bundle as defined in claim 1 wherein said elastomer compatible material is selected from the group consisting of a resorcinol aldehyde latex and a mixture of a resorcinol aldehyde resin and a vinyl pyridine-styrene-butadiene terpolymer latex.

3. A glass fiber bundle as defined in claim 1 wherein Z is selected from the group consisting of halogen and alkoxy containing 1 to 6 carbon atoms.

4. A glass fiber bundle as defined in claim 1 wherein R is selected from the group consisting of alkyl, alkenyl, aryl and their amino and epoxy substituted derivatives.

5. A glass fiber bundle as defined in claim 1 wherein $m$ is an integer from 0 to 1.

6. A glass fiber bundle as defined in claim 1 wherein said impregnant constitutes between 5–25% by weight of the glass fiber bundle.

7. A glass fiber bundle as defined in claim 1 wherein the individual fibers within the bundle have a thin coating thereon.

8. A glass fiber bundle as defined in claim 7 wherein said thin coating includes said coupling agent.

9. In a glass fiber-elastomeric product in which an elastomeric material constitutes a continuous phase in which the glass fibers are distributed, the improvement in the bonding relationship between the glass fibers and the elastomeric material in which the fibers are distributed comprising a coating on the glass fibers including a coupling agent selected from the group consisting of (1) a compound of the formula

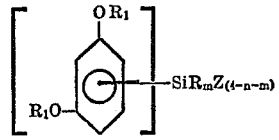

wherein Z is a readily hydrolyzable group, $n$ is an integer from 1 to 3, $m$ is an integer from 0 to 2, R is selected from the group consisting of hydrogen and an organic group other than resorcinol and $R_1$ is selected from the group consisting of hydrogen and $C_1$ to $C_3$ alkyl, (2) a compound of the formula

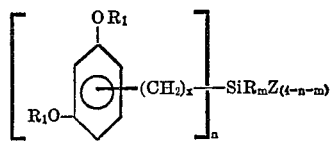

wherein R, $R_1$, $m$ and $n$ are as set forth above and $x$ is an integer from 1 to 4 and (3) silanols and siloxanes of (1) and (2) above.

10. A product as defined in claim 9 wherein the glass fibers are distributed in the elastomeric material in the form of individual glass fibers, said coating being formed on the surface thereof.

11. A product as defined in claim 10 wherein said coating includes a material selected from the group consisting of a fiber forming material, a lubricant and mixtures thereof.

12. A product as defined in claim 9 wherein the glass fibers are distributed in the elastomeric material in the form of a bundle containing an elastomer compatible impregnant and the coupling agent.

13. A glass fiber bundle formed of a plurality of glass fibers with each of the glass fibers having a thin size coating on the surfaces thereof formed from a coupling agent selected from the group consisting of (1) a compound of the formula:

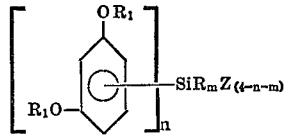

wherein Z is a readily hydrolyzable group, $n$ is an integer from 1 to 3, $m$ is an integer from 0 to 2, R is selected from the group consisting of hydrogen and an organic group other than resorcinol, and $R_1$ is selected from the group consisting of hydrogen and $C_1$ to $C_3$ alkyl, (2) a compound of the formula:

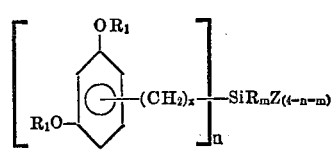

wherein R, $R_1$, $m$, $n$ and Z are as set forth above and $x$ is an integer from 1 to 4, and (3) silanols and polysiloxanes of (1) and (2) above, and an impregnant comprising a mixture of a resorcinol-aldehyde resin and an elastomer in the bundle.

14. A glass fiber bundle having an impregnant therein, said impregnant comprising an elastomer compatible material and a chromic complex coupling agent formed by the reaction of chromyl chloride with a compound selected from the group consisting of resorcinol and a polymethylol-substituted resorcinol.

15. A glass fiber bundle as defined in claim 14 wherein said elastomer compatible material is selected from the group consisting of a resorcinol aldehyde latex and a mixture of a resorcinol aldehyde resin and a vinyl pyridine-styrene-butadiene terpolymer latex.

16. In a glass fiber-elastomeric product in which an elastomeric material constitutes a continuous phase in which the glass fibers are distributed, the improvement in the bonding relationship between the glass fibers and the elastomeric material in which the fibers are distributed comprising a coating on the glass fibers including a coupling agent formed by the reaction of chromyl chloride with a compound selected from the group consisting of resorcinol and a polymethylol-substituted resorcinol.

17. A product as defined in claim 16 wherein the glass fibers are distributed in the elastomeric material in the form of individual glass fibers, said coating being formed on the surfaces thereof.

18. A product as defined in claim 17 wherein said coating includes a material selected from the group consisting of a fiber forming material, a lubricant and mixtures thereof.

19. A product as defined in claim 16 wherein the glass fibers are distributed in the elastomeric material in the form of a bundle containing an elastomer compatible impregnant and the coupling agent.

20. A glass fiber bundle formed of a plurality of glass fibers, each of the glass fibers having a thin size coating on the surfaces thereof formed from a chromic complex coupling agent prepared by the reaction of chromyl chloride with a compound selected from the group consisting of resorcinol and a polymethylol-substituted resorcinol and an elastomer compatible impregnant in the bundle.

References Cited
UNITED STATES PATENTS

| | | | |
|---|---|---|---|
| 2,544,668 | 3/1951 | Goebel et al. | 260—438 |
| 3,137,720 | 6/1964 | Cooper | 260—448.2 |
| 3,328,450 | 6/1967 | Pleuddemann | 260—448.8 |
| 3,391,052 | 7/1968 | Marzocchi | 161—176 |
| 3,413,186 | 11/1968 | Marzocchi | 161—176 |
| 3,508,990 | 4/1970 | Marzocchi | 161—176 |
| 3,451,886 | 6/1969 | Eakins | 161—93 |
| 3,508,990 | 4/1970 | Marzocchi | 161—176 |

DANIEL J. FRITSCH, Primary Examiner

U.S. Cl. X.R.

57—153, 164; 117—126 GS, 126 GQ, 161 ZA, 163; 161—193, 202, 203, 204; 260—438.5 R, 46.5 Y, 448.2 B, 448.8 R